May 26, 1970     J. A. ROSS     3,513,585

INSECT TRAP

Filed Feb. 17, 1969     2 Sheets-Sheet 1

INVENTOR
JOHN A. ROSS

By *Harbaugh and Thomas*
Attorneys

May 26, 1970        J. A. ROSS        3,513,585

INSECT TRAP

Filed Feb. 17, 1969        2 Sheets-Sheet 2

INVENTOR
JOHN A. ROSS

By Harbaugh and Thomas
Attorneys

| United States Patent Office | 3,513,585 |
|---|---|
| | Patented May 26, 1970 |

3,513,585
INSECT TRAP
John A. Ross, Winthrop Harbor, Ill., assignor to Hall Industries, Inc., North Chicago, Ill., a corporation of Illinois
Filed Feb. 17, 1969, Ser. No. 799,746
Int. Cl. A01m *1/04*
U.S. Cl. 43—113          11 Claims

ABSTRACT OF THE DISCLOSURE

A device to attract and kill flying insects wherein rays of light, both reflected and direct, are transmitted upwardly through the surface of a liquid contained in an open-topped receptacle of transparent material nested at its bottom periphery upon a top closure plate, also transparent, the closure plate having a double curved flange encompassing and holding a lower reflector plate within a weatherproof bottom closure or housing for the light source and the electrical connections.

Background of the invention

The prior art shows many different devices employing a light source above and behind and beneath a liquid for decorative purposes or for the purpose of attracting and trapping flying insects. Illumination through a liquid, particularly liquids containing a dye is used for many decorative purposes. Some devices use outer glass bulbs to contain the colored liquid and place the light source centrally within a protective chimney of glass, colored or not to give unusual effects. Where the light source is intended to be above the liquid it is necessary to use some kind of support rods across the liquid surface to hold the bulbs, etc. In other designs a light bulb is suspended over a pan of water which pan is associated with a container for bait and supported on a stanchion. Mirrors are also used to amplify or direct the light reflections over the surface of the water for decoration and in insect traps. Lantern type devices are known using a light source suspended from arcuate side brackets and providing reflecting vanes between the bracket and the surface of the liquid. Plastic screens of flourescent material having a dazzling effect partly enclosing the liquid surface and held by means of elongated support or housing structures are used with the light source placed thereunder and properly insulated and protected from the water trap. Where reflectors are used they are positioned above the liquid surface to direct reflected light rays down upon the liquid surface.

One of the principal disadvantages of the prior art is that the surface of the liquid intended to trap the insects is obstructed and full advantage is not obtained of the entire liquid surface and all of the light from the light source as combined means for attracting and trapping flying insects. All have obstructions which are within the path of flight of the insect to the light and water trap. Furthermore, devices of this type must as a practical matter be adapted to be disassembled for cleaning and removal of the dead insects. Not only must the liquid that is used in the device be changed from time to time to avoid odors but also the tray and associated parts must be cleaned as they form films of odor-producing organic matter thereon in short periods of time. Consequently it is highly desirable that an insect trap be easily disassembled for cleaning and not present a multitude of cracks, corners and inaccessible surfaces which cannot be properly cleaned and disinfected. Radial struts, vanes, reflectors, brackets and the like all interfere with the efficiency and cleanliness of the prior art devices.

Another disadvantage of the prior art devices is that their structure is complicated in order to meet the local, state and federal safety requirements. Bringing together the combination of a trapping liquid, conductive metal pans, struts, cowlings and a light source which is electrically operated complicates the design of these devices as far as public safety and avoidance of liability are concerned. Also it is highly desirable that insect traps be designed for operation both in and out of doors with equal facility and without necessity of providing additional insulation or rain protection where out-of-door use is contemplated. There is the ever present danger of spilling water on the electrical connections and causing a short circuit.

The instant invention provides an insect trapping device which utilizes all of the attractive rays from the light source with reflective means to concentrate any stray light beams and directs the collected light rays from the source through the entire body of liquid. In this manner an unobstructed path of both flight and sight is provided between the insect and the entrapping water surface. In addition the component parts of the insect trap of this invention are formed from molded or pressed sheet metal or plastic parts in such a manner that all of the corners are rounded or smooth and interlocking flanges are provided for the reflective and insulating surface such that the device is stable when in use or being carried and it therefore meets the most stringent insulating standards for public protection. The device of this invention is readily inspected, filled, cleaned and used without danger of spilling and with the electrical parts fully protected at all times, yet made easily and simply accessible when necessary. In summary the invention eliminates the aforestated disadvantages of the prior art.

Summary of the invention

The invention relates therefore to an insect trap having a bottom closure with an open top, a reflector mounting plate nesting therein and providing the means for mounting the electrical system, the plate having a particularly formed reflective surface on its top side constituting the environment of the light source, a transparent top closure plate having a central raised embossment and overlapping peripheral flanges to effectively seal the juncture between the top edges of the bottom closure and the reflector plate and a liquid container of transparent material nested over the embossment and having a rounded downwardly depending peripheral flange resting upon and encompassing the top closure plate. The device of this invention lends itself to construction into any geometric form, i.e., either a rectilinear or cylindrical form, and has a low center of gravity even when the liquid container is filled so that this invention is characterized by the simplicity of the formed parts which nest together one upon the other into a unitary stable combination that is inexpensive to manufacture, easy to use, safe, and readily disassembled for inspection and cleaning.

The insect trap of this invention, as will be seen from the description, utilizes all of the rays of light from the source shining through the body of liquid to trap flying insects. The entire liquid body or surface becomes a source of attraction for the insects. In this invention rays of light from, or reflected from, below the surface of the liquid are visible from all angles to insects flying above or in the vicinity of liquid with no obstructions therebetween. As the flying insects see the light source and attempt to fly to the source of the light rays, the body of liquid intersects that path and they are inevitably entrapped.

An object of the invention is to provide means to increase the area of the environment from which the flying insects are attracted without diminishing the effectiveness of that attraction in locations near the trap. There are no indirect paths to destruction.

The device of this invention can be used on any fairly level surface both indoors and outdoors and can be placed upon a supporting stand. The general shape of the liquid container can be any geometric design and because of the cooperating nesting flanges employed the component parts can be rapidly and inexpensively fabricated from sheet material, either plastic or metal, the latter where light transmitting properties are unnecessary as will be described.

Description of the drawings

This invention is illustrated by the drawings showing the preferred embodiments wherein.

The preferred embodiments

Figure 1:
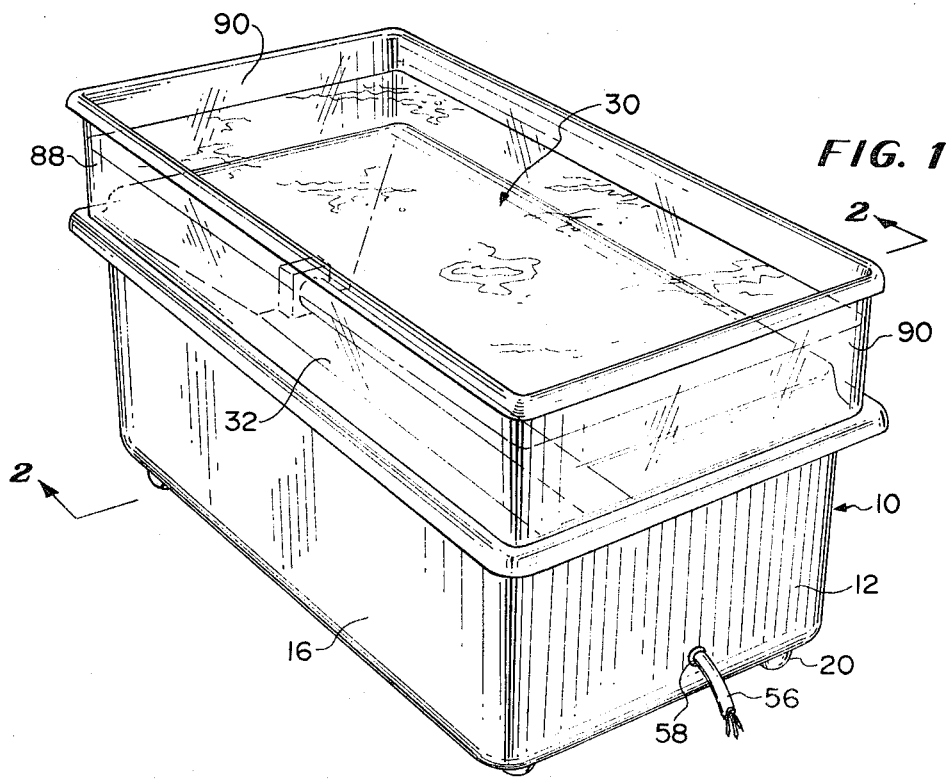
FIG. 1 is a perspective view of an assembled rectangular insect trap, the extension cord of which is partially shown.

Referring to FIG. 1 the insect trap of this invention is illustrated by the bottom closure 10 having the end walls 12 and 14 and the side walls 16 and 18. The closure is provided with the foot or support members 20 underneath and integral with the bottom 22 and positioned at or near the four corners to provide a firm and even footing for the device. The bottom closure 10 is rectangular with the sides 16 and 18 about twice the length of the ends 12 and 14. The device can also be fabricated in a square configuration with the sides and ends of equal length.

Figure 2:
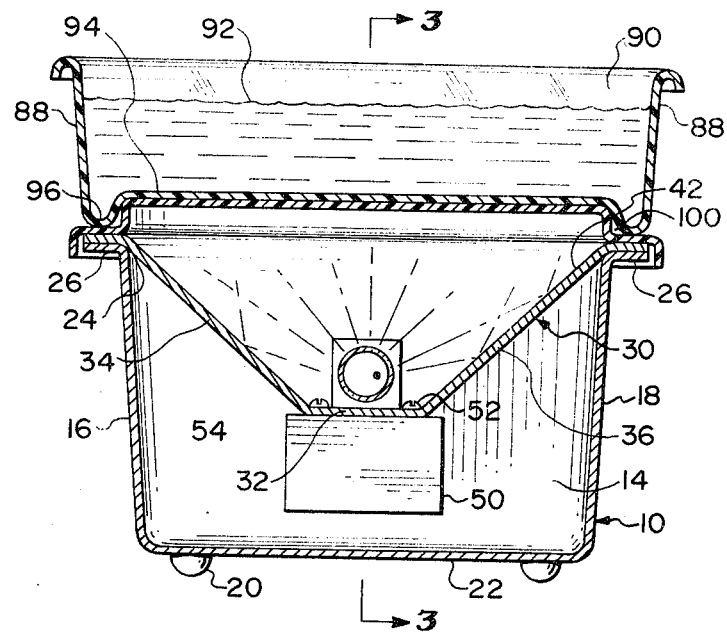
FIG. 2 is a partial cross-sectional view taken along lines 2—2 of FIG. 1.
Figure 3:
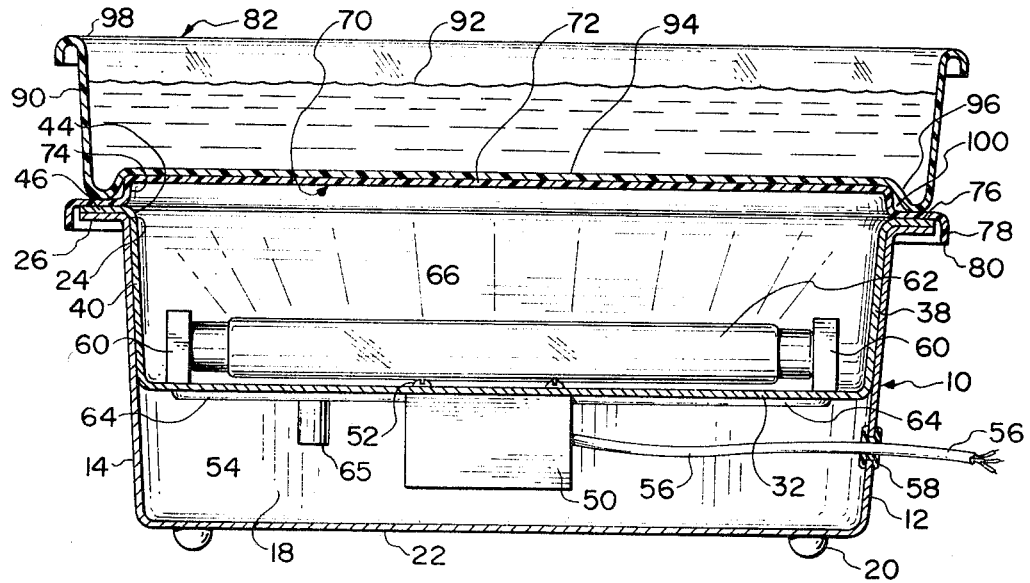
FIG. 3 is a partial cross-sectional view taken along the lines 3—3 of the embodiment shown in FIG. 2.

Referring still to FIG. 1 and more particularly to FIGS. 2 and 3, the bottom closure 10 is shown to have generally flat sides and bottom, the former depending outwardly at a slight angle from the latter so that the inside area of the bottom is less than the top opening defined by the rounded inner edge 24 which extends outwardly as the integral peripheral flat flange 26. The flange 26 extends from all of the sides at the periphery of the bottom closure but need not be continuous thereabout or the same width in the horizontal plane of the opening or edge 24.

Nested within the bottom closure 10 is the reflector mounting plate 30 having the elongated flat bottom 32 integral with the sides 34 and 36 and the ends 38 and 40. The sides and ends of the plate 30 having the internal reflecting surface 42 which may be polished metal, metal foil or composed of a bright metal coating on plastic. The upper periphery of the reflector mounting plate 30 terminates in the curved edge 44 extending into the flat flange 46. Here also the flange 46 need not be continuous but preferably is constructed so as to come into registry with the flange 26, thus provided a nested supporting and laterally reinforcing relationship with the bottom closure 10. The side walls 34 and 36 are positioned at an angle of about 40° to 50° to the plane of the bottom 32 while the end walls 38 and 40 diverge upwardly from each other at an angle to the bottom 32 which is substantially the same as the angle subtended by the plane of the end walls 12 and 14 with the bottom 22. The reflector plate 30 preferably fits snugly end to end within the bottom closure so that for all practical purposes these parts are integral. As will be seen from this description there is no reason for removing the reflector plate from the bottom closure. If desired a layer of adhesive, i.e. epoxy resins can be used between the contacting surfaces of the flanges 26 and 46 and the aforementioned wall members.

The reflector mounting plate 30 carries the ballast (transformer) 50 by means of the screws 52 within the space 54 of the spaced bottoms 22 and 32. The electrical conduit for the insect trap is shown at 56 extending through the grommet 58 in an aperture in the end wall 12. Switch means, to be described, can be located at any desired location in the circuit, preferably mounted in the lower portion or within the space 54 with the button or toggle exposed through the side wall. The circuit is connected to one or both of the mounting connectors 60 between which the light source 62 is connected and supported. The light source 62 can be any type of light bulb and is represented by a flourescent lamp, best suited for the elongated form of the insect trap illustrated. The connections between the ballast 50 and the connectors is illustrated by the conduits 64 and includes the starter 65.

Positioned above the reflector mounting plate 30 and defining the space 66 therebetween is the transparent top closure plate 70 having the central raised embossment 72 coextensive in area with the opening defined by the rounded edge 44 of the reflector plate 30. The embossment has the downwardly depending flange 74 and the flat peripheral flange 76 terminating in the peripheral downturned tubular depending outer flange 78. The outer flange 78 is continuous around the periphery of the trap and extends so that the edge 80 is below the overlapping flanges 26 and 46. This structure assures that any water or other ilquid that may be spilled upon the closure plate 70 or rain will not enter the spaces 66 or 54. The top closure plate 70 is constructed of transparent plastic in the preferred embodiment.

The liquid container 82 completes the assembly and has the side walls 88 and the end walls 90 forming an enclosure for the liquid 92. The bottom 94 of the container 82 has the peripheral embossed or double flange 96 formed by rolled edges that conform to the flange 74 and peripheral flange 76 of the top closure plate. The flange 96 is continuous about the bottom of the container 82. Both the top closure plate 70 and the container 82 are removable although the latter can be solvent cemented to the reflector plate flange if desired. The top edge 98 of the container is rolled downwardly. A space 100 is provided between the bottom 94 at the flange 96 and the upper surface of the flange 74.

Figure 4:
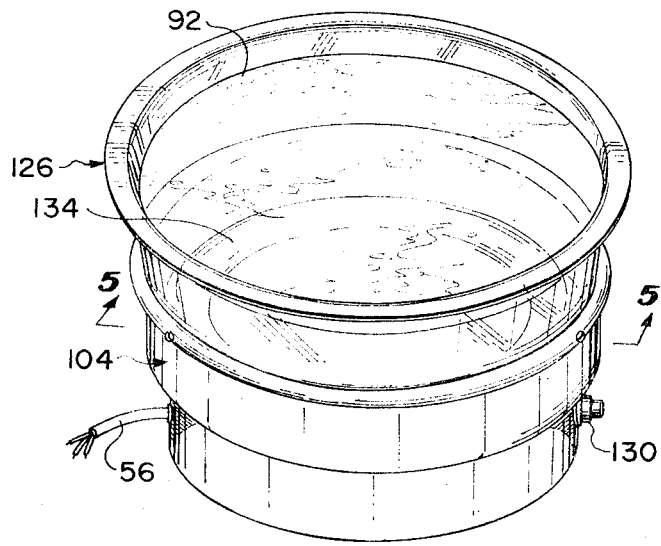
FIG. 4 is a perspective view of an assembled circular insect trap illustrating another embodiment of the invention and FIG. 5 is a partial cross-sectional view taken along the lines 5—5 of FIG. 4.
Figure 5:
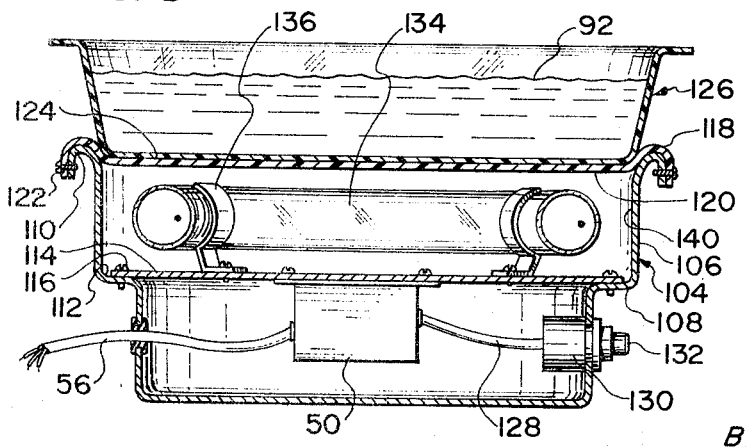

Referring to FIGS. 4 and 5, another form of insect trap is shown having a circular configuration. In this embodiment the bottom closure 104 differs in that the side wall 106 has the molded flange or offset 108 therearound and the top flange 110 is turned downwardly. This forms two supporting surfaces, the internal surface 112 upon which the circular supporting reflector plate 114 rests and is fastened, from the top, by means of the screws 116, and the top of the flange 110 which matches with the outer circumferential downturned flange 118 of the transparent cover plate 120. Here again screws as indicated at 122 are used to detachably hold the plate to the bottom closure 104. The recess 124 formed by the flange 118 receives the liquid container 126 which is pan shaped. The entrapping liquid is shown at 92.

The electrical components include the conduit 56, the transformer 50, held by suitable screws to the underside of the plate 114 and preferably centrally located. The conduit 128 leads to the switch 130 having the push button 132 for convenience in operation and controls the current output to the circular fluorescent lamp 134. The lamp is supported by the brackets 136 affixed to the top of the plate 114.

The connection between the current source through to the lamp 134 is by means of a known type of plug, not shown, which would be positioned at 120° from either bracket. This fluorescent lamp mounting is known in the art and no part of this invention. The lamp 134 is centrally located and substantially equally spaced from the inner reflecting surface 140 of the bottom closure 104. Both the surfaces 114 and 140 can be reflective, i.e., bright metal or metallized plastic or only the surface 114 can be reflective, as desired.

The circuits used for the fluorescent lamps 62 and 134 can be of the preheat or instant-start type, in which event the switch 132 is eliminated. In the preheat lamp circuit the starter 65 is connected by conduits (not shown) to the connectors 60, as is known in the art. An instant start circuit would be used where fluorescent lamps of greater than 20 watts are used and a higher ballast voltage is used. The lamp holders 60 for instant-start circuits are connected so that the ballast 50 is disconnected when the lamp is removed to eliminate the hazard of high voltage during maintenance operations.

What is claimed is:
1. An insect trap comprising:
   (a) a bottom closure having an open top and a flat peripheral outer flange extending from the side walls,
   (b) a concave reflector mounting plate provided with a flat peripheral outer flange adapted to rest upon said flange of said bottom closure and having reflective surfaces on the upper side of said concavity,
   (c) a light source within said concavity,
   (d) a light-transmitting top closure plate having a raised central embossment bounded by a downwardly depending double rolled flanged edge, the outer roll of which encompasses the matching flat flanges of said mounting plate and bottom closure, and
   (e) an open-topped light-transmitting liquid container having a bottom embossment nesting with the embossment on said top closure plate and bordered by an arcuate edge matching the inner roll of said flanged edge of said top closure plate.
2. An insect trap in accordance with claim 1 in which the matching flanged edges of said closure plates and container are rectilinear.
3. An insect trap in accordance with claim 2 in which said edges are rectangular.
4. An insect trap in accordance with claim 1 in which the matching flanged edges of said closure plate and container are cylindrical.
5. An insect trap in accordance with claim 1 in which said reflecting surfaces of said mounting plate are planar and intersect at an angle greater than 90°.
6. An insect trap in accordance with claim 5 in which:
   (a) said reflecting surfaces intersect in a focal plane above the bottom of said bottom closure,
   (b) said light source is mounted on the reflecting side of said focal plane, and
   (c) means are provided on the underside of said intersecting planes to attach electrical components associated with said light source.
7. An insect trap comprising:
   (a) a bottom closure having an open top,
   (b) a wall across said closure intermediate the top and bottom and having an upper reflecting surface,
   (c) a light source above said reflecting surface,
   (d) a light-transmitting top closure plate over the top of the closure,
   (e) an open-topped light-transmitting liquid container supported by the top closure plate, and
   (f) said top closure plate and the bottom wall of said container having matching convolutions to maintain the container on the plate while supporting liquid therein.
8. An insect trap in accordance with claim 7 in which:
   (a) said convolutions are peripheral.
9. An insect trap in accordance with claim 8 in which:
   (a) the convolutions comprise a peripheral matching flange encompassing and in juxtaposition to a circumferential curved wall of the container.
10. An insect trap in accordance with claim 7 in which:
    (a) the wall of the closure has a circumferential offset defining an inner flat peripheral surface, and
    (b) said wall across said closure engages said surface.
11. An insect trap in accordance with claim 7 in which:
    (a) said wall divides the closure into a lower seated compartment for electrical components and connections, and
    (b) an upper compartment sealed by said top closure plate for said light source.

References Cited

UNITED STATES PATENTS

| | | | |
|---|---|---|---|
| 1,333,454 | 3/1920 | Sato | 119—5 |
| 1,723,272 | 8/1929 | Emma | 240—2 |
| 2,286,568 | 6/1942 | Petry | 43—113 |

WARNER H. CAMP, Primary Examiner

U.S. Cl. X.R.

119—5; 240—2